United States Patent [19]
Hengel

[11] Patent Number: 4,618,641
[45] Date of Patent: Oct. 21, 1986

[54] CONCENTRATED, AQUEOUS DISPERSIONS OF VINYLIDENE FLUORIDE POLYMERS AND A PROCESS FOR THEIR PREPARATION

[75] Inventor: Rolf Hengel, Burgkirchen, Fed. Rep. of Germany

[73] Assignee: Hoechst Aktiengesellschaft, Fed. Rep. of Germany

[21] Appl. No.: 785,160

[22] Filed: Oct. 7, 1985

[30] Foreign Application Priority Data

Oct. 11, 1984 [DE] Fed. Rep. of Germany ....... 3437278

[51] Int. Cl.$^4$ .............................................. C08K 5/09
[52] U.S. Cl. .................................................. 524/284
[58] Field of Search ......................................... 524/284

[56] References Cited

U.S. PATENT DOCUMENTS 4,502,888 3/1985 Leng et al. ........................... 524/284
4,505,990 3/1985 Dasgupta ............................. 524/284

FOREIGN PATENT DOCUMENTS 0002809 10/1981 European Pat. Off.
1074268 7/1960 Fed. Rep. of Germany.
2635402 2/1977 Fed. Rep. of Germany.
2457102 11/1980 Fed. Rep. of Germany.

Primary Examiner—Joseph L. Schofer
Assistant Examiner—N. Sarofim
Attorney, Agent, or Firm—Connolly and Hutz

[57] ABSTRACT

Concentrated, aqueous, colloidal dispersions of copolymers of vinylidene fluoride with other fluoroolefinic compounds containing, as the dispersion stabilizer, ammonium salts of a carboxylic acid having 10 to 14 carbon atoms, preferably ammonium laurate, are described.

11 Claims, No Drawings

CONCENTRATED, AQUEOUS DISPERSIONS OF VINYLIDENE FLUORIDE POLYMERS AND A PROCESS FOR THEIR PREPARATION

The invention relates to concentrated, aqueous, colloidal dispersions of copolymers of vinylidene fluoride containing at least 5% by weight of vinylidene fluoride and, in addition to vinylidene fluoride, at least one fluoroolefinic compound, having a solids content of 30 to 65% by weight and a content of dispersion stabilizer, and to a process for their preparation.

Aqueous, colloidal dispersions of fluoropolymers are used to a large extent for coating and impregnating substrates of a very wide variety of types. However, aqueous, colloidal dispersions obtained directly from the polymerization process are not very suitable for this purpose, since the homopolymerization or copolymerization processes for fluorine-containing monomers can in most cases only be taken, without excessive formation of coagulates, to a solids content of polymer in the region of 30% by weight. Coatings made with such dispersions are, however, uneconomical and not very satisfactory, since not only is it necessary to evaporate an excessive amount of water after the coating process, but also the layer thickness and the film-forming properties do not meet the requirements demanded. It is, therefore, customary and well-known to those skilled in the art to subject such dispersions to a concentration process which raises the solids content to values of up to 65% by weight. Known concentration processes of this type are gentle evaporation in vacuo (U.S. Pat. No. 3,316,201), concentration by electrodecantation (British Patent No. 642,025) or concentration by ultrafiltration (U.S. Pat. No. 4,369,266). It is necessary in these processes to add an anionic, nonionic or cationic dispersion stabilizer which is intended to prevent the coagulation of the colloidally dispersed fluoropolymer. Alkoxylated alkylphenols, and also an alkali metal laurylsulfate are employed particularly frequently for such purposes in commercial products. The use of alkali metal and ammonium stearates has also already been described. All these dispersion stabilizers which are added before or during the concentration process remain in the dispersion and are also intended, in particular, to ensure stability during storage and transport to the place where the dispersion is used. However, the presence of such dispersion stabilizers in coating processes such as are carried out with concentrated, aqueous fluoropolymer dispersions of this type also entails disadvantages. Above all in the case of polymers of vinylidene fluoride, which require relatively low baking temperatures and are therefore particularly suitable for fabric coating, it is found that the coatings obtained exhibit considerable discolorations after baking and that the portions of dispersion stabilizers which remain therein have a tendency to "exudation", which produces a tacky surface on the coating and has a very disadvantageous effect on its antiadhesion properties and soiling behavior.

In order to eliminate these disadvantages, a concentrated, aqueous, colloidal dispersion of the type mentioned initially which contains, as the dispersion stabilizer, 2 to 8% by weight, based on the solids content of the concentrated dispersion, of at least one ammonium salt of a carboxylic acid having 10 to 14 carbon atoms is suggested in accordance with the present invention.

The dispersions according to the invention preferably contain 3 to 6% by weight, based on the solids content of the concentrated dispersion, of the said ammonium salt. This content can also be mixtures of such ammonium salts within the said range of numbers of carbon atoms. It is preferable to employ the ammonium salts of linear carboxylic acids. Ammonium laurate is particularly preferred.

The colloidal, aqueous dispersions according to the invention are dispersions of copolymers of vinylidene fluoride with fluoroolefinic comonomers. These fluoroolefinic comonomers are preferably comonomers of the formula

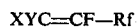

in which
X is F, Cl or H and
Y is F, Cl or H and
Rf is F, CF$_3$ or a perfluoroalkoxy radical having 1 to 4, preferably 3 carbon atoms in the perfluoroalkyl group; provided that vinylidene fluoride itself is excepted.

It is also possible to employ dispersions of several of these copolymers as a mixture. These copolymers contain at least 5% by weight of vinylidene fluoride.

The present invention relates especially to concentrated, colloidal, aqueous dispersions of the following copolymers of vinylidene fluoride: copolymers formed from vinylidene fluoride and hexafluoropropylene; copolymers formed from vinylidene fluoride and chlorotrifluoroethylene; copolymers formed from vinylidene fluoride and tetrafluoroethylene; copolymers formed from vinylidene fluoride and a perfluorinated alkyl vinyl ether of the formula

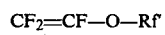

in which Rf is a saturated perfluoroalkyl radical having 1 to 4 carbon atoms; copolymers formed from vinylidene fluoride, tetrafluoroethylene and a perfluorinated alkyl vinyl ether of the formula mentioned above which can, if appropriate, also contain hexafluoropropylene in addition; and, particularly preferentially, copolymers formed from vinylidene fluoride, tetrafluoroethylene and hexafluoropropylene. The copolymers mentioned thus embrace both copolymers having predominantly thermoplastic properties and copolymers having elastomeric properties. The preparation of the starting latices of such copolymers of vinylidene fluoride, which is usually effected by copolymerizing the appropriate monomers in the presence of fluorinated emulsifiers, is known to those skilled in the art. A detailed description of the preparation of aqueous, colloidal dispersions of the copolymer formed from vinylidene fluoride and hexafluoropropylene is given in U.S. Pat. Nos. 3,006,881, 3,051,677 and 3,178,399; the preparation of the copolymer formed from vinylidene fluoride and chlorotrifluoroethylene is given in U.S. Pat. Nos. 3,006,881, 3,072,590 and 3,163,628; the preparation of the copolymer formed from vinylidene fluoride and tetrafluoroethylene is given in U.S. Pat. Nos. 2,468,054 and 3,163,628 and in German Pat. No. 1,074,268; the preparation of the copolymer formed from vinylidene fluoride and a perfluoroalkyl vinyl ether is given in U.S. Pat. No. 3,136,745; the preparation of the copolymer formed from vinylidene fluoride, tetrafluoroethylene and a perfluorinated vinyl ether or from vinylidene fluoride, tetrafluoroethylene, a perfluorinated vinyl ether and hexafluoropropylene is given in U.S. Pat. No.

3,235,537, European Patent No. 2,809 and German Auslegeschrift No. 2,457,102; and finally, the preparation of the copolymer formed from vinylidene fluoride, tetrafluoroethylene and hexafluoropropylene is given in U.S. Pat. Nos. 2,968,649 and 4,123,603, German Offenlegungsschrift No. 2,635,402 and U.S. Pat. No. 4,335,238. In particular, all these copolymers of vinylidene fluoride can also be prepared in the presence of permanganates as initiators, as described in U.S. Pat. No. 3,632,847.

The aqueous, colloidal starting dispersions prepared in this way contain an emulsifier, preferably the salt of a perfluorinated carboxylic acid or a carboxylic acid substituted by fluorine and chlorine. However, this emulsifier cannot on its own ensure the stability of the concentrated, colloidal dispersion during the concentration process and when the concentrated dispersions are stored and transported, even if its proportion is increased by adding more than the amount present as a result of the polymerization. It is therefore necessary to add a dispersion stabilizer before or during the concentration process carried out by one of the procedures mentioned initially, to which express reference is made here.

Selecting an ammonium salt of a $C_{10}$ to $C_{14}$ carboxylic acid, in particular ammonium laurate, affords the following advantages: the strong discolorations formed in the coatings on baking, in most cases irregular discolorations, when other dispersion stabilizers are used, in particular the customary nonionic dispersion stabilizers, are largely eliminated. The substrates, in particular fabrics, which have been coated with the concentrated dispersions, according to the invention, of vinylidene fluoride polymers have a uniform, opaque white to slightly yellowish color. No traces at all of the dispersion stabilizer can be found on the surface of such coatings; the surface has a dry and smooth feel. As a result the soiling behavior is considerably improved; the anti-adhesion behavior of the fluoropolymer is not impaired. Finally, the concentrated, aqueous dispersions, according to the invention, of vinylidene fluoride polymers are absolutely stable on storage; no coagulation can be detected even during storage lasting for months.

The advantages cannot be achieved by means of known dispersion stabilizers or emulsifiers. Whereas when nonionic dispersion stabilizers or alkali metal alkylsulfates are employed, the coatings produced exhibit not only severe discolorations but also a tacky surface, as a result of which the anti-adhesion properties of the fluoropolymer are largely destroyed, if ammonium stearate is added, the resulting stability on storage is so poor that further processing is only possible within a few hours. Alkali metal laurates also produce discolored and tacky coatings; with the alkali metal salts of fairly long chain carboxylic acids there is also poor stability on storage.

The dispersions according to the invention can also contain conventional additives, such as, for examples, fillers and pigments, for example titanium dioxide, antimony trioxide, carbon black or colored pigments, and also vicosity regulators or antifouling agents or bactericides.

The dispersions according to the invention are used particularly for coating organic and inorganic fabrics composed of natural and synthetic fibers, mineral fibers, glass fibers or carbon fibers. However, they are also suitable for use as coatings for other metallic or nonmetallic, closed surfaces, for example for coating optical fiber cables.

The invention is illustrated by the following Examples:

EXAMPLE 1

200 ml of a 20% strength by weight solution of ammonium laurate are added to 4 kg of a 20% strength by weight dispersion of a copolymer formed from 90% by weight of vinylidene fluoride and 10% by weight of hexafluoropropylene. The pH of the copolymer dispersion is then adjusted to a value of 6 to 7, and the dispersion is concentrated on a rotary evaporator to a solids content of 55% by weight. A drop of the dispersion is put on a Kofler heated stage at 200° C. A colorless residue remains. A polyester fabric is immersed 3 times in the dispersion and is dried at 200° C. A coating is formed which has a very slight yellowish color. The coating is not wetted by water. The surface is smooth and dry.

EXAMPLE 2

3 liters of a 20% strength by weight solution of ammonium laurate are added to 40 kg of a 30% strength by weight dispersion of a terpolymer formed from 55% by weight of vinylidene fluoride, 25% by weight of hexafluoropropylene and 20% by weight of tetrafluoroethylene. The pH is adjusted to a value of 6 to 7 and the dispersion is concentrated on a rotary evaporator to a solids content of 55% by weight. A drop of the dispersion is put on a Kofler heated stage at 200° C.; a colorless residue remains. A polyester fabric is immersed 3 times in the dispersion and is dried at 200° C. A coating is formed which has a very slightly yellowish color and which is not wetted by water. The surface is smooth and dry.

EXAMPLE 3

60 liters of a 20% strength by weight solution of ammonium laurate are added to 800 kg of a 30% strength by weight dispersion of a terpolymer formed from 60% by weight of tetrafluoroethylene, 25% by weight of vinylidene fluoride and 15% by weight of hexafluoropropylene. The pH is adjusted to a value of 6 to 7 and the dispersion is concentrated to a solids content of 55% by weight on an ultrafiltration apparatus using hose membranes of the Nadir ® type. A drop of the dispersion is put on a Kofler heated stage at 200° C.; a colorless residue remains. A polyester fabric is immersed 3 times in the dispersion and is dried at 200° C. A coating is formed which is pore-free, has a very slightly yellowish color and is not wetted by water. The surface is smooth and dry.

I claim:

1. An improved concentrated, aqueous, colloidal dispersion of at least one copolymer of vinylidene fluoride containing at least 5% strength by weight of vinylidene fluoride and at least one further fluoroolefinic comonomer, having a solids content of 30 to 65% by weight, based on the total weight of the concentrated dispersion, wherein the improvement comprises having a content of 2 to 8% strength by weight, based on the solids content of the concentrated dispersion, of at least one ammonium salt of a carboxylic acid, which has 10 to 14 carbon atoms and is unsubstituted by fluorine or chlorine, as dispersion stabilizer.

2. An improved concentrated, aqueous, colloidal dispersion of a copolymer of vinylidene fluoride as claimed in claim 1, wherein the copolymer contains, in addition to vinylidene fluoride, at least one further fluoroolefinic comonomer of the formula XYC=CF—Rf in which
X is F, Cl or H and
Y is F, Cl or H and
Rf is F, CF₃ or a perfluoroalkoxy radical having 1 to 4 carbon atoms in the perfluoroalkyl group, with the proviso that vinylidene fluoride itself is excepted.

3. An improved concentrated, aqueous, colloidal dispersion of a copolymer of vinylidene fluoride as claimed in claim 1, wherein the copolymer is a copolymer formed from vinylidene fluoride and tetrafluoroethylene.

4. An improved concentrated, aqueous, colloidal dispersion of a copolymer of vinylidene fluoride as claimed in claim 1, wherein the copolymer is a copolymer formed from vinylidene fluoride and hexafluoropropylene.

5. An improved concentrated, aqueous, colloidal dispersion of a copolymer of vinylidene fluoride as claimed in claim 1, wherein the copolymer is a copolymer formed from vinylidene fluoride and chlorotrifluoroethylene.

6. An improved concentrated, aqueous, colloidal dispersion of a copolymer of vinylidene fluoride as claimed in claim 1, wherein the copolymer is a copolymer formed from vinylidene fluoride, hexafluoropropylene and tetrafluoroethylene.

7. An improved concentrated, aqueous, colloidal dispersion of a copolymer of vinylidene fluoride as claimed in claim 1, wherein the copolymer is a copolymer formed from vinylidene fluoride, perfluoropropyl perfluorovinyl ether and tetrafluoroethylene.

8. An improved concentrated, aqueous, colloidal dispersion of a copolymer of vinylidene fluoride as claimed in claim 1, wherein the copolymer is a copolymer formed from vinylidene fluoride, perfluoropropyl perfluorovinyl ether and tetrafluoroethylene and hexafluoropropylene.

9. An improved concentrated, aqueous, colloidal dispersion of at least one copolymer of vinylidene fluoride, as claimed in claim 1, which contains ammonium laurate as the dispersion stabilizer.

10. In a process for the preparation of a concentrated, colloidal, aqueous dispersion of a copolymer of vinylidene fluoride containing at least 5% by weight of vinylidene fluoride and, in addition to vinylidene fluoride, at least one further fluoroolefinic compound, and having a solids content of 30 to 65% by weight as claimed in claim 1 by concentrating an aqueous, colloidal dispersion of the same polymer having a lower solids content by adding a disperion stabilizer before or during the concentration process, wherein the improvement comprises adding, as the dispersion stabilizer, an ammonium salt of a carboxylic acid having 10 to 14 carbon atoms in an amount such that its content in the concentrated dispersion is 2 to 8% by weight, based on the weight of the solids content of the concentrated dispersion.

11. A process according to claim 10, wherein the ammonium salt of a carboxylic acid is ammonium laurate.

* * * * *